US008193885B2

(12) United States Patent
Godkin

(10) Patent No.: US 8,193,885 B2
(45) Date of Patent: Jun. 5, 2012

(54) LINEAR VOICE COIL ACTUATOR AS A BI-DIRECTIONAL ELECTROMAGNETIC SPRING

(75) Inventor: Mikhail Godkin, San Diego, CA (US)

(73) Assignee: BEI Sensors And Systems Company, Inc., Moorpark, CA (US)

(*) Notice: Subject to any disclaimer, the term of this patent is extended or adjusted under 35 U.S.C. 154(b) by 0 days.

(21) Appl. No.: 11/635,323

(22) Filed: Dec. 7, 2006

(65) Prior Publication Data
US 2007/0149024 A1 Jun. 28, 2007

Related U.S. Application Data

(60) Provisional application No. 60/748,278, filed on Dec. 7, 2005.

(51) Int. Cl.
*H01F 7/00* (2006.01)
*H01H 9/00* (2006.01)

(52) U.S. Cl. .......................... 335/229; 335/179
(58) Field of Classification Search .............. 335/229, 335/230
See application file for complete search history.

(56) References Cited

U.S. PATENT DOCUMENTS

| | | | | |
|---|---|---|---|---|
| 2,919,324 A * | 12/1959 | Schuessler | ...................... | 335/137 |
| 3,022,450 A * | 2/1962 | Chase, Jr. | ........................ | 361/194 |
| 3,460,081 A * | 8/1969 | Tillman | .......................... | 335/234 |
| 3,728,654 A * | 4/1973 | Tada | ............................... | 335/234 |
| 3,944,957 A * | 3/1976 | Kotos et al. | .................... | 335/174 |
| 4,243,899 A * | 1/1981 | Jaffe | ................................ | 310/14 |
| 4,306,164 A * | 12/1981 | Itoh et al. | .................... | 310/49.32 |
| 4,358,691 A * | 11/1982 | Naylor | ......................... | 310/12.24 |
| 4,363,980 A * | 12/1982 | Petersen | ......................... | 310/15 |
| 4,422,060 A * | 12/1983 | Matsumoto et al. | .......... | 335/256 |
| 4,600,910 A * | 7/1986 | Vanderlaan | ..................... | 335/229 |
| 4,641,117 A * | 2/1987 | Willard | .............................. | 335/7 |
| 4,845,392 A * | 7/1989 | Mumbower | ..................... | 310/14 |
| 4,876,521 A * | 10/1989 | Boyd | .............................. | 335/179 |
| 4,928,028 A * | 5/1990 | Leibovich | ........................ | 310/23 |
| 5,434,549 A | 7/1995 | Hirabayashi et al. | | |
| 5,699,030 A * | 12/1997 | Leikus et al. | ....................... | 335/4 |
| 5,896,076 A * | 4/1999 | van Namen | .................... | 335/229 |
| 5,969,589 A * | 10/1999 | Raj | .................................. | 335/277 |
| 6,009,615 A * | 1/2000 | McKean et al. | .............. | 29/602.1 |
| 6,094,119 A * | 7/2000 | Reznik et al. | .................. | 335/284 |
| 6,229,421 B1 * | 5/2001 | Floyd et al. | .................... | 335/253 |
| 6,366,189 B1 * | 4/2002 | Bergvall et al. | ................ | 335/256 |

(Continued)

OTHER PUBLICATIONS

International Search Report for PCT/US06/46751, mailed Feb. 7, 2008.

*Primary Examiner* — Lincoln Donovan
*Assistant Examiner* — Alexander Talpalatskiy
(74) *Attorney, Agent, or Firm* — Gilman Clark & Hunter LLC

(57) ABSTRACT

"Electromagnetic spring" characteristics can be obtained in a voice coil actuator by deliberately selecting some or all of geometry, location of the housing, field assembly and coils, and/or magnitude and direction of the current applied to the coils; for example, predetermined bidirectional spring characteristics can be provided by appropriate deliberate selection of the relative dimensions of the housing and field assembly, and the spring characteristics can be further altered though the addition of structures, such as a radially magnetized magnet, or a soft magnetic extension, positioned at an end of the housing, and/or by applying current of a selected magnitude and direction to the coil assembly.

9 Claims, 4 Drawing Sheets

U.S. PATENT DOCUMENTS

| | | | |
|---|---|---|---|
| 6,414,577 B1 * | 7/2002 | Hoffman | 335/229 |
| 6,639,496 B1 | 10/2003 | van Namen | |
| 6,815,846 B2 | 11/2004 | Godkin | |
| 6,831,538 B2 | 12/2004 | Godkin | |
| 6,836,201 B1 * | 12/2004 | Devenyi et al. | 335/229 |
| 6,870,454 B1 | 3/2005 | Vladimirescu et al. | |
| 6,933,827 B2 * | 8/2005 | Takeuchi et al. | 336/212 |
| 6,960,847 B2 * | 11/2005 | Suzuki et al. | 310/14 |
| 7,145,423 B2 * | 12/2006 | Suzuki et al. | 335/229 |
| 2004/0027221 A1 * | 2/2004 | Godkin | 336/130 |
| 2004/0090295 A1 * | 5/2004 | Yajima et al. | 335/229 |

\* cited by examiner

LINEAR VOICE COIL ACTUATOR AS A BI-DIRECTIONAL ELECTROMAGNETIC SPRING

RELATED APPLICATIONS

The present application claims priority under 35 U.S.C. §119(e) from provisional application No. 60/748,278, filed Dec. 7, 2005.

TECHNICAL FIELD

The present invention relates generally to linear voice coil actuators, and in particular to a linear voice coil actuator with bidirectional electromagnetic spring characteristics.

BACKGROUND ART

In typical linear voice coil actuators of the type with moving magnets, a moving field assembly is utilized along with a stationary coil assembly attached to a soft magnetic housing. The soft magnetic housing also serves as a back iron for the magnetic circuit. The field assembly is typically comprised of an axially magnetized cylindrical magnet, sandwiched between two soft magnetic pole pieces. The coil assembly can be formed of several coils located in the circular cavities of the coil base attached to the magnetic cylinder or housing. Normally, the axial length of this magnetic cylinder is minimized for a given field assembly length and the stroke. Typically, no other effects are considered.

U.S. Pat. Nos. 6,815,846 and 6,831,538, naming the same inventor as the subject application, and which are assigned to the assignee of the subject application, disclose linear voice coil actuators having spring characteristics that can be viewed as similar to a "one way" mechanical spring, either in extension or in compression.

SUMMARY OF INVENTION

It has been discovered that predetermined bidirectional spring characteristics can be provided in linear voice coil actuator configurations by appropriate deliberate selection of the relative dimensions of the housing and field assembly. The spring characteristics can be further altered through the addition of structures, such as a radially magnetized magnet, or a soft magnetic extension, positioned at an end of the housing, and/or by applying current of a selected magnitude and direction to the coil assembly.

One embodiment of the invention is a linear actuator comprising a housing of soft magnetic material and having a length $L_h$, a coil assembly positioned in the housing, a field assembly positioned in the housing for movement relative to the coil assembly and having a length $L_f$ and including an axially magnetized magnet, wherein a difference between $L_h$ and $L_f$ is selected to provide a predetermined force between the field assembly and the housing when the coils are not energized. In a further embodiment, the coil assembly is positioned in the housing at a point which is offset from a position of the Field Assembly in the housing when the coils are not energized.

Another embodiment of the invention is a linear actuator comprising a housing of soft magnetic material, a coil assembly positioned in the housing, a field assembly positioned in the housing for movement relative to the coil assembly and including an axially magnetized magnet, wherein a force is provided between the field assembly and the housing when the coils are not energized, and further including a housing extension of magnetic material positioned at one end of the housing and having an axial length selected so that the field assembly has or assumes a position offset from the coil assembly when the coil assembly is not energized. In the linear actuator of this embodiment, the magnetic material may be a soft magnetic ring. Alternatively, the magnetic material may be a radially magnetized magnet of a properly selected polarity.

The above embodiments may further include a support structure positioned in the housing and having a surface, which supports the field assembly for movement in the housing. The support structure may be formed of a plastic. The plastic may be of materials sold under the trademarks: Teflon, PEEK, Delrin, Ultem.

A further embodiment of the invention can be viewed as an assembly comprising a housing of soft magnetic material and having a length $L_h$, a coil assembly attached to the housing, a field assembly positioned in the housing for movement relative to the coil assembly and having a length $L_f$ and including an axially magnetized magnet, wherein a difference between $L_h$ and $L_f$ is selected to provide a predetermined force between the field assembly and the housing when the coils are not energized, and further wherein, a selected magnitude and direction of current is applied to the coils to alter spring characteristics of the assembly.

A still further embodiment of the invention comprises a housing of soft magnetic material and having a length $L_h$, a Coil Assembly attached to the housing, a Field Assembly positioned in the housing for movement relative to the coil assembly and having a length $L_f$ and including an axially magnetized magnet, wherein a difference between $L_h$ and $L_f$ is selected to provide a predetermined force between the field assembly and the housing when the coils are not energized, and further wherein, a housing extension is positioned at an end of the housing, wherein the housing extension is dimensioned to provide a predetermined alteration of spring characteristics of the assembly. In the assembly of this embodiment a magnitude and direction of current may be applied to the coil assembly to provide a further predetermined alteration of spring characteristics of the assembly.

A method for configuring a linear actuator according to an embodiment of the invention comprises configuring a housing of soft magnetic material to have a length $L_h$, positioning a coil assembly in the housing, configuring a field assembly to be positioned in the housing for movement relative to the coil assembly, to have a length $L_f$, and to include an axially magnetized magnet, and selecting a difference between $L_h$ and $L_f$ to provide a predetermined force between the Field Assembly and the housing when the coils are not energized.

Another method for configuring an electromagnetic spring in accordance with the invention comprises configuring a housing of soft magnetic material to have a length $L_h$, supporting a Coil Assembly in the housing, configuring a Field Assembly to be positioned in the housing for movement relative to the coil assembly, to have a length $L_f$ and to include an axially magnetized magnet, selecting a difference between $L_h$ and $L_f$ to provide a predetermined force between the field assembly and the housing when the coils are not energized, and positioning a housing extension at an end of the housing, wherein the housing extension is dimensioned to provide a predetermined alteration of spring characteristics of the electromagnetic spring.

It is therefore an object of the present invention to provide a linear voice coil actuator with predetermined bidirectional spring characteristics by selection of the relative dimensions of the housing and field assembly.

It is another object of the present invention to provide a linear actuator with selected spring-like characteristics by deliberately selecting some or all of geometry, location of the housing, field assembly and coils, and magnitude and direction the current applied to the coils, so that predetermined "electromagnetic spring" characteristics are obtained.

These and other objectives, features and advantages of the present invention will be more readily understood upon consideration of the following detailed description, and accompanying drawings.

DESCRIPTION OF THE PREFERRED EMBODIMENTS

Figure 1:
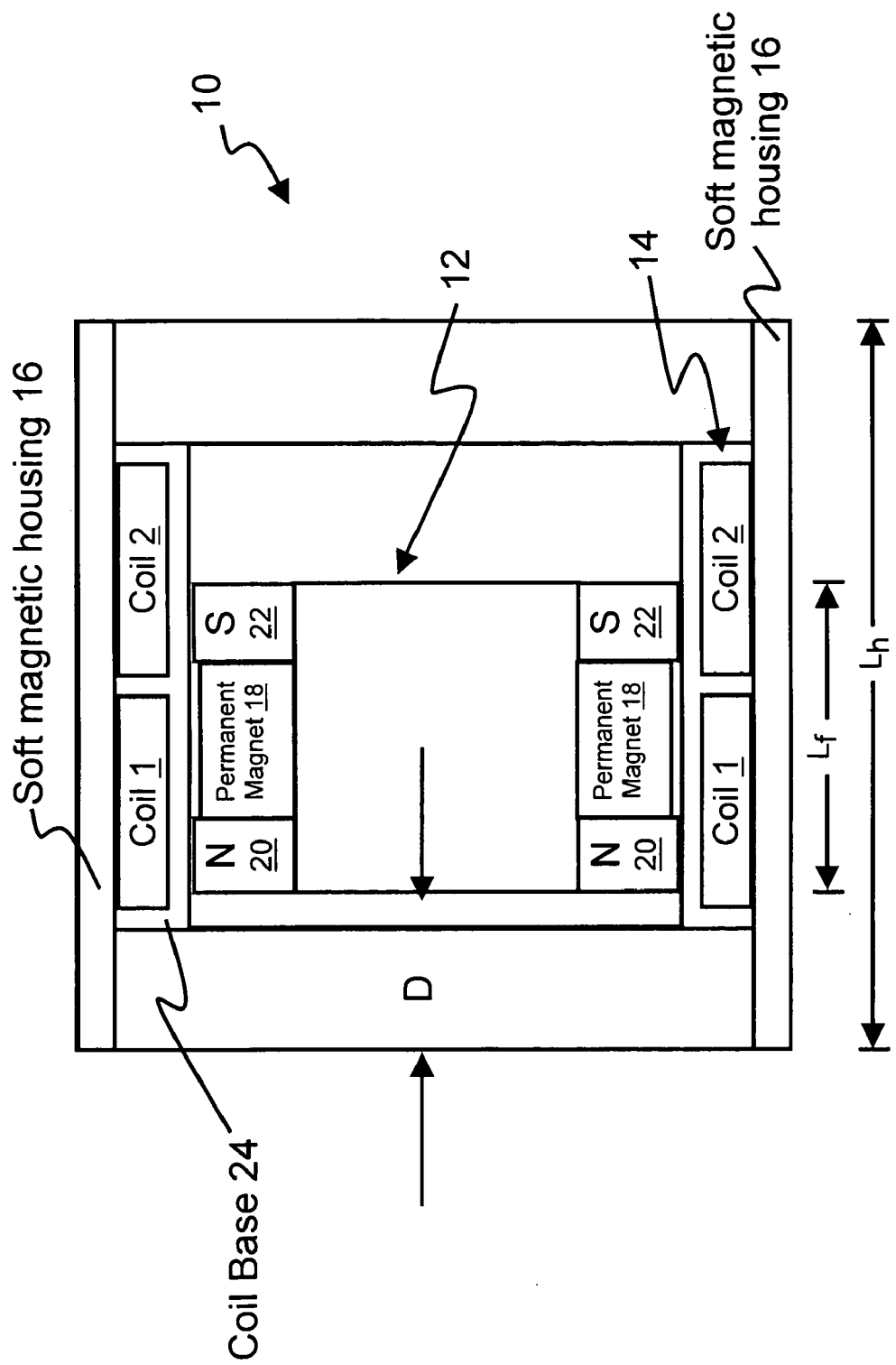
FIG. 1 illustrates an embodiment of the present invention in which the dimension D is specifically selected to provide a desired spring characteristic for the actuator.

FIG. 1 illustrates an embodiment of the present invention in which the dimension D is specifically selected to provide a desired spring characteristic for the actuator 10. As shown in FIG. 1, the actuator may include a moving Field Assembly 12 and a stationary Coil Assembly 14 attached to a soft magnetic housing 16. The soft magnetic housing 16 also serves as a back iron for the magnetic circuit of the actuator. The Field Assembly 12 includes an axially magnetized cylindrical magnet 18, sandwiched between two soft magnetic pole pieces 20, 22. The coil assembly includes coils 1 and 2, located in the circular cavities of a coil base 24 attached to the magnetic cylinder (soft magnetic housing 16).

When coils 1 and 2 are de-energized, the Field Assembly 12 moves to an equilibrium position in which it is equidistantly located relative to the edges of the magnetic housing 16. By selecting the length of this magnetic tube or magnetic housing 16, the effect of the "preferred position" of the Field Assembly 12 can be negligible or extremely pronounced.

The desired spring effect is achieved in one embodiment by varying the distance D, shown in FIG. 1, between the edge of the Field Assembly 12 and the edge of the stationary magnetic back iron 16, when the Field Assembly 12 is in its initial position. The distance D may be expressed as $$D = (\text{length of soft magnetic housing}, L_h - \text{length of Field Assembly}, L_f)/2.$$

Figure 2:
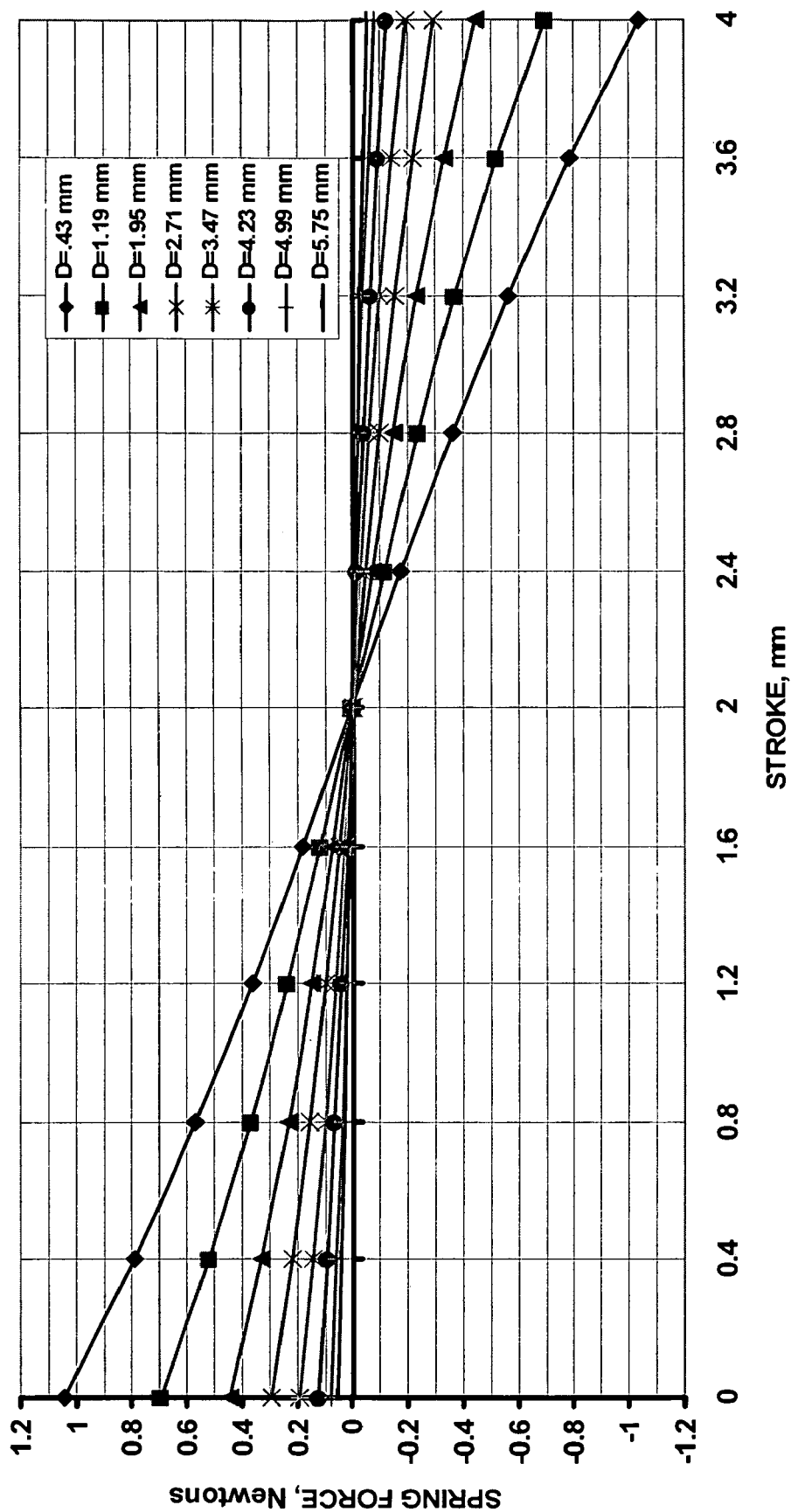
FIG. 2 shows a family of Force vs. Stroke characteristics of an embodiment of a proposed actuator in accordance with the present invention for different distances D, when the coils are not energized.

FIG. 2 shows a family of Force vs. Stroke characteristics of an embodiment of a proposed actuator in accordance with the present invention for different distances D, when the coils are not energized. It can be seen that when, for example, this distance D is changed from 0.43 mm to 5.75 mm, the force pushing the Field Assembly 12 to the magnetic center position is dropped by factor of 20.

It is also to be understood that the spring characteristics provided can be altered by applying a selected magnitude and direction of current to the coils. Further, changes in spring characteristics as well as operating characteristics of the actuator may be achieved by altering the position of the coils 1, 2 with respect to the "preferred position" of the Field Assembly 12. For example, where the coils 1, 2 are offset from being centered about the "preferred position" of the Field Assembly 12, forces produced by the energized coils in such an actuator will be influenced by the interaction between the housing edges and the Field Assembly 12, as a function of the offset distance.

Figure 3:
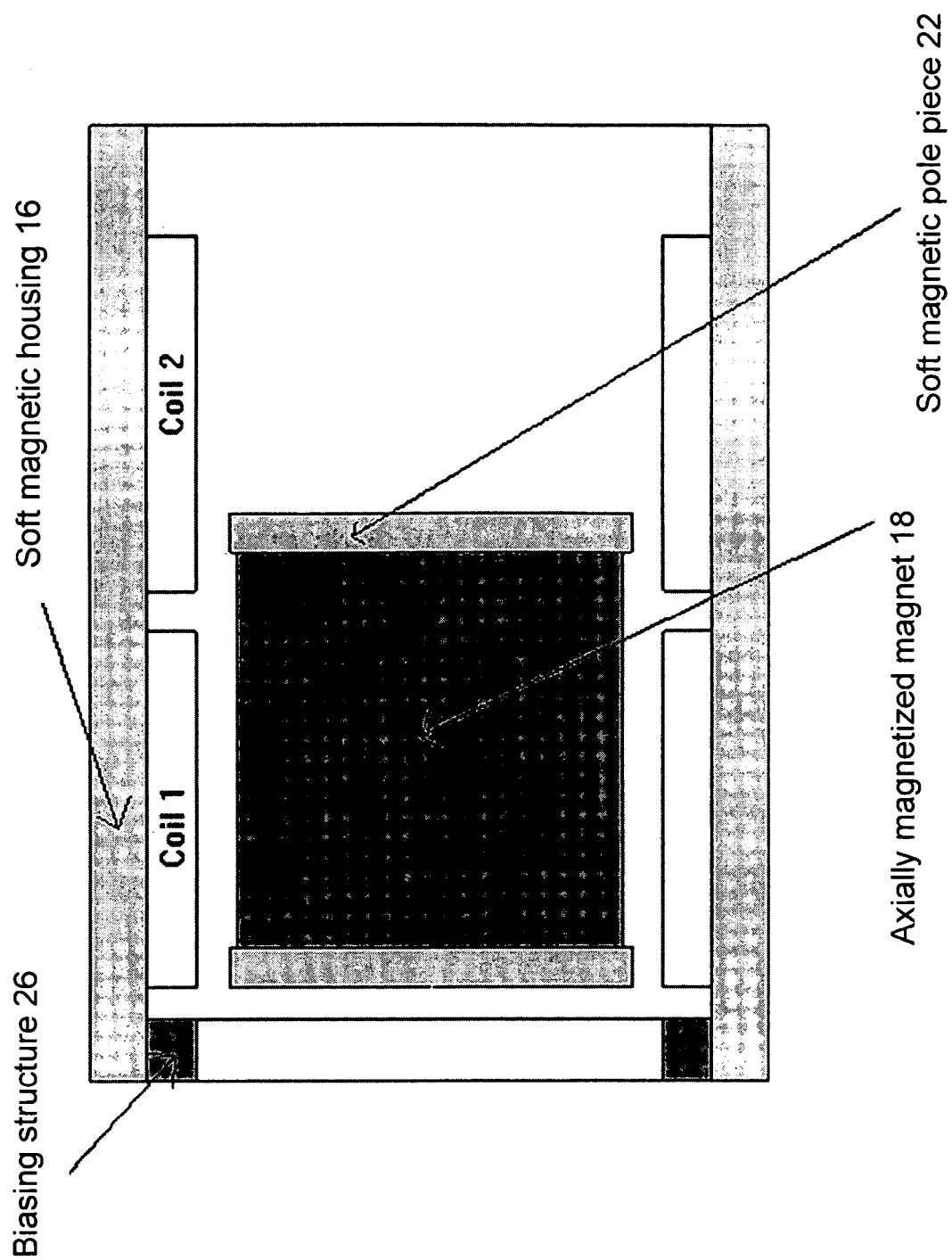
FIG. 3 illustrates a further embodiment of the present invention in which an extension or biasing structure may be provided at an end of the housing.
Figure 4:
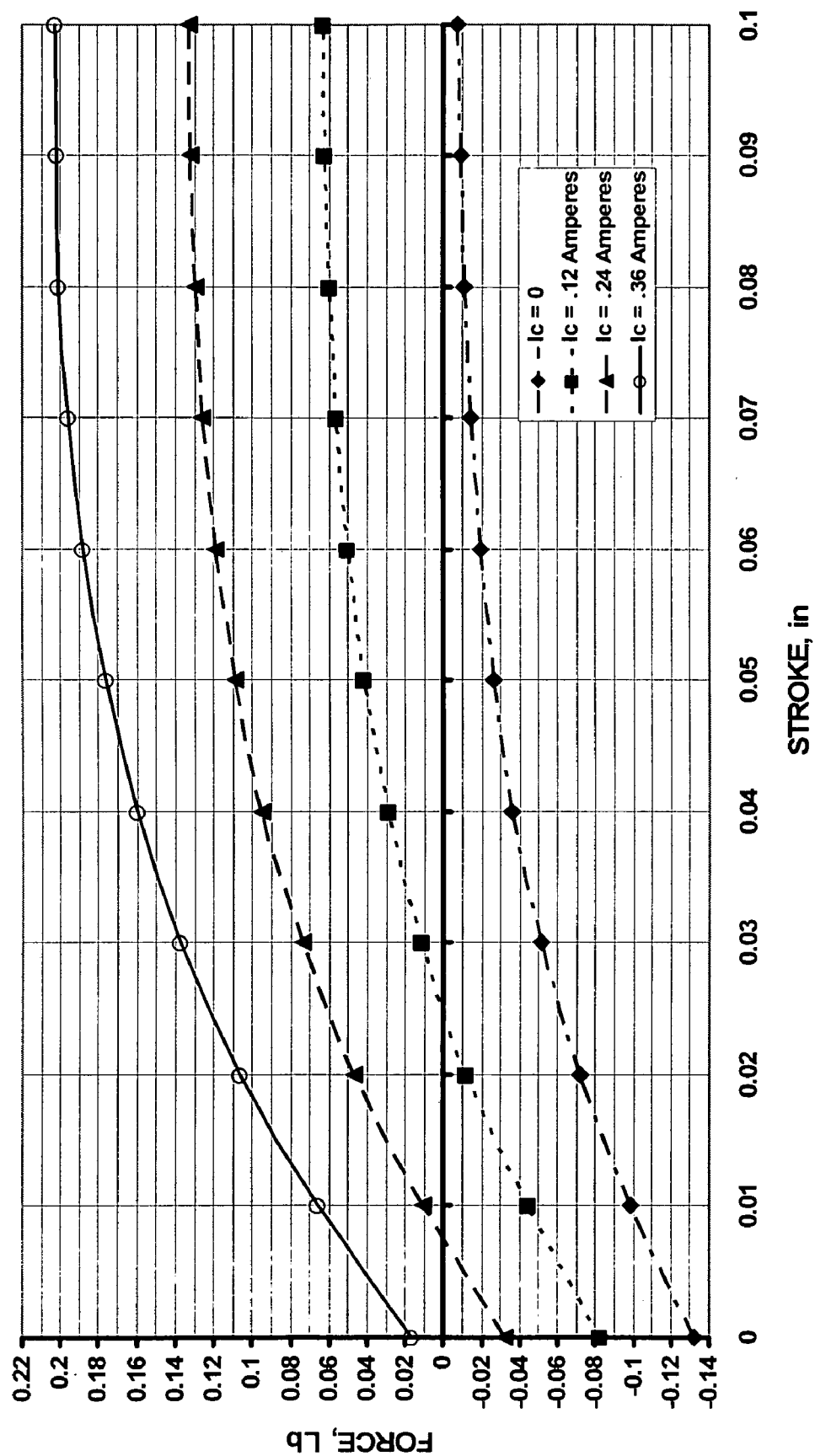
FIG. 4 illustrates the effects of applying different magnitudes and a particular direction of a current in the coils in the embodiment of FIG. 3.

FIGS. 3 and 4 illustrate further embodiments of the present invention. In the embodiment illustrated in FIG. 3, an extension or biasing structure 26 may be provided at an end of the housing. The structure 26 may be a radially magnetized bias magnet or soft magnetic ring, or similar structure. In FIG. 3, the biasing structure 26 is shown positioned at the left end of the housing. The result of employing a radially magnetized bias magnet for such a biasing structure 26 can be seen in FIG. 4, for a coil current, Ic, equal to zero—namely, that at stroke position 0, there is a negative force, for example approximately 0.13 Lb, generated in the actuator. This force increases with increasing stroke, as shown, up to a magnitude of minus 0.007, at stroke of 0.1 in. As will be apparent to those skilled in the art, the polarity of the radially magnetized bias magnet is selected in accordance with the polarity of the axially magnetized magnet facing the above mentioned bias magnet to create a detent (attraction) force.

FIG. 4 also illustrates the effects of applying different magnitudes and a particular direction of a current in the coils. Thus, for the proposed embodiment illustrated in FIG. 4, an applied coil current of 0.24 Amperes is expected to produce the forces plotted (using squares) for the different strokes. For such an applied current, a resulting force is produced which shifts the Force versus Stroke curve in a positive direction, such that for stroke positions above approximately 0.025 in, positive forces are produced, while for stroke positions less than approximately 0.025 in, negative forces are presented, as shown.

Thus, it can be seen that by deliberately selecting some or all of geometry, location of the housing, field assembly and coils, and/or magnitude and direction of the current applied to the coils, different characteristics of an "electromagnetic spring" can be obtained.

In a further embodiment of the present invention, in order to minimize the number of parts, the Field Assembly may be configured to slide on the inside surface of the coil base made from the appropriate plastic material to reduce the friction. Examples of suitable plastic materials include materials manufactured under the trademarks: Teflon (a trademark of E.I. du Pont de Nemours of Wilmington, Del.), PEEK (a trademark of Victrex PLC of Lancashire, England), Delrin (a trademark of E.I. du Pont de Nemours of Wilmington, Del.), Ultem (a trademark of General Electric Company of New York, N.Y.).

It should be noted that in one embodiment an actuator is provided which can be considered as a bidirectional electromagnetic spring controlled by the amount and direction of the current in the coils. When this actuator feature is employed, there is no need in using a mechanical spring if it is required by the application.

It is to understood that while the descriptions provided herein use a cylindrical configuration to describe examples of the present invention, shapes other than cylindrical are envisioned within the spirit of the invention. Further, although the examples provided above use two coils, other numbers of coils may be used, as will be recognized by those skilled in the art. Those skilled in the art will also recognize that other field assembly configurations may be used beyond the particular configurations described above.

The terms and expressions employed herein are terms of description and not of limitation, and there is no intent in the use of such terms and expressions of excluding equivalents of the features shown and described, or portions thereof, it being recognized that various modifications are possible within the scope of the invention claimed.

What is claimed is:

1. A linear actuator comprising:
    a housing of soft magnetic material, the housing having a first end and a second end;
    a coil assembly positioned in the housing;

a field assembly positioned in the housing for movement relative to the coil assembly and including an axially magnetized permanent magnet, wherein a force is provided between the field assembly and the housing when the coil assembly is not energized; and further including a housing extension of hard magnetic material positioned at the first end of the housing and having an axial length selected so that the field assembly assumes a particular position offset from the coil assembly and nearer to the first end of the housing than to the second end of the housing each time that the coil assembly is not energized, wherein an attraction force between the housing extension and the field assembly provides a predetermined spring characteristic of the actuator such that an amount of attraction force applied to the field assembly by the housing extension changes based at least in part on the proximity of the field assembly to the housing extension, wherein a polarity of an end the housing extension proximate to the field assembly is opposite of a polarity of an end of the axially magnetized permanent magnet of the field assembly proximate to the housing extension to create the attraction force between the housing extension and the field assembly, and wherein the attraction force between the housing extension and the field assembly is opposite in direction to a force provided by the coil assembly when the coil assembly is energized and a current is passing through coils of the coil assembly in a first direction.

2. The linear actuator of claim 1, wherein the magnetic material is a radially magnetized magnet.

3. The linear actuator of claim 1, further including a support structure positioned in the housing and having a surface which supports the field assembly for movement in the housing.

4. The linear actuator of claim 3, wherein the support structure is formed of a plastic.

5. The linear actuator of claim 4, wherein the plastic is selected from materials sold under the trademarks: Teflon, PEEK, Delrin, Ultem.

6. A linear actuator comprising:
a housing of soft magnetic material and having a length $L_h$, the housing having a first end and an second end;
a coil assembly attached to the housing;
a field assembly positioned in the housing for movement relative to the coil assembly and having a length $L_f$ and including an axially magnetized permanent magnet;
wherein a difference between $L_h$ and $L_f$ is selected to provide a predetermined force between the field assembly and the housing when the coil assembly is not energized; and
further wherein, a housing extension of hard magnetic material is positioned at the first end of the housing, wherein the housing extension is dimensioned to provide a predetermined spring characteristic of the assembly, and
wherein the housing extension has an axial length selected so that the field assembly assumes a particular position offset from the coil assembly and nearer to the first end of the housing than to the second end of the housing each time that the coil assembly is not energized, wherein an attraction force between the housing extension and the field assembly provides the predetermined spring characteristic of the actuator such that an amount of force applied to the field assembly by the housing extension changes based at least in part on the proximity of the field assembly to the housing extension,
wherein a polarity of an end the housing extension proximate to the field assembly is opposite of a polarity of an end of the axially magnetized permanent magnet of the field assembly proximate to the housing extension to create the attraction force between the housing extension and the field assembly, and
wherein the attraction force between the housing extension and the field assembly is opposite in direction to a force provided by the coil assembly when the coil assembly is energized and a current is passing through coils of the coil assembly in a first direction.

7. The linear actuator of claim 6, wherein a magnitude and direction of current is applied to the coil assembly to provide a further predetermined alteration of spring characteristics of the assembly.

8. A method for configuring an electromagnetic spring, the method comprising:
configuring a housing of soft magnetic material to have a length $L_h$, the housing having a first end and a second end;
supporting a coil assembly in the housing;
configuring a field assembly to be positioned in the housing for movement relative to the coil assembly, to have a length $L_f$ and to include an axially magnetized permanent magnet;
selecting a difference between $L_h$ and $L_f$ to provide a predetermined force between the field assembly and the housing when the coil assembly is not energized; and
positioning a housing extension of hard magnetic material at the first end of the housing,
wherein the housing extension is dimensioned to provide a predetermined alteration of the spring characteristics of the electromagnetic spring; and
wherein the housing extension has an axial length selected so that the field assembly assumes a particular position offset from the coil assembly and nearer to the first end of the housing than to the second end of the housing each time that the coil assembly is not energized,
wherein an attraction force between the housing extension and the field assembly provides the predetermined spring characteristic of the actuator such that an amount of force applied to the field assembly by the housing extension changes based at least in part on the proximity of the field assembly to the housing extension,
wherein a polarity of an end the housing extension proximate to the field assembly is opposite of a polarity of an end of the axially magnetized permanent magnet of the field assembly proximate to the housing extension to create the attraction force between the housing extension and the field assembly,
wherein the attraction force between the housing extension and the field assembly is opposite in direction to a force provided by the coil assembly when the coil assembly is energized and a current is passing through coils of the coil assembly in a first direction.

9. The method of claim 8 wherein the positioning a housing extension step includes fanning the housing extension of a radially magnetized magnet.

* * * * *